US011272664B2

United States Patent
Li et al.

(10) Patent No.: US 11,272,664 B2
(45) Date of Patent: Mar. 15, 2022

(54) DEVICE FOR CONVEYING AND FEEDING WET MATERIAL FOR CROSS-FLOW HOT AIR COMBINE HARVESTER

(71) Applicant: JIANGSU UNIVERSITY, Zhenjiang (CN)

(72) Inventors: Yaoming Li, Zhenjiang (CN); Zheng Ma, Zhenjiang (CN); Lizhang Xu, Zhenjiang (CN); Zhong Tang, Zhenjiang (CN); Jianting Wang, Zhenjiang (CN); Min Han, Zhenjiang (CN)

(73) Assignee: Jiangsu University, Jiangsu (CN)

( * ) Notice: Subject to any disclaimer, the term of this patent is extended or adjusted under 35 U.S.C. 154(b) by 137 days.

(21) Appl. No.: 16/627,963

(22) PCT Filed: Dec. 19, 2017

(86) PCT No.: PCT/CN2017/117188
§ 371 (c)(1),
(2) Date: Dec. 31, 2019

(87) PCT Pub. No.: WO2019/095495
PCT Pub. Date: May 23, 2019

(65) Prior Publication Data
US 2021/0137008 A1    May 13, 2021

(30) Foreign Application Priority Data

Nov. 20, 2017    (CN) .......................... 201711187122.6

(51) Int. Cl.
*A01D 61/00*    (2006.01)
*A01D 41/133*    (2006.01)
(Continued)

(52) U.S. Cl.
CPC ......... *A01D 61/002* (2013.01); *A01D 41/133* (2013.01); *F26B 19/005* (2013.01);
(Continued)

(58) Field of Classification Search
CPC ... A01D 61/002; A01D 41/133; F26B 19/005; F26B 23/001; F26B 25/002; F26B 2200/06; F26B 21/12
See application file for complete search history.

(56) References Cited

U.S. PATENT DOCUMENTS 3,096,165 A * 7/1963 Lane ..................... F26B 19/005
34/183
4,209,918 A * 7/1980 Klein ................... A01D 41/133
34/182
(Continued)

FOREIGN PATENT DOCUMENTS

CN    203301994 U    11/2013
CN    203708836 U    7/2014
(Continued)

OTHER PUBLICATIONS

International Search Report corresponding to International Patent Application No. PCT/SN2017/117188 dated Jul. 23, 2018. (English Translation].

*Primary Examiner* — Alicia Torres
*Assistant Examiner* — Matthew Ian Neal
(74) *Attorney, Agent, or Firm* — Jenkins, Wilson, Taylor & Hunt, P.A.

(57) ABSTRACT

A device for conveying and feeding wet material for a cross-flow hot air combine harvester, the device consisting of a hot air pumping part and a material conveying part. The hot air pumping part uses an air suction pump (4) to pump a flow of hot waste air from an engine radiator (1) of the combine harvester by means of an air suction pipeline (3) so as to provide hot air flow for the material conveying and feeding device. The material conveying part consists of a chain harrow-type conveying groove structure (A) and a cross-flow air chamber structure (B), wherein the chain harrow-type conveying groove structure (A) is used for forcibly conveying and feeding a material; and the cross-flow air chamber structure (B) uses hot air to dry the material, blows to assist in feeding the material, and uses a cross-flow air wheel (14) to forcibly feed the material.

15 Claims, 3 Drawing Sheets

(51) Int. Cl.
*F26B 19/00* (2006.01)
*F26B 23/00* (2006.01)
*F26B 25/00* (2006.01)

(52) U.S. Cl.
CPC .......... *F26B 23/001* (2013.01); *F26B 25/002* (2013.01); *F26B 2200/06* (2013.01)

(56) References Cited

U.S. PATENT DOCUMENTS

| | | | | |
|---|---|---|---|---|
| 4,509,273 A * | 4/1985 | Roisen | ................ | A01D 41/133 |
| | | | | 110/227 |
| 5,105,563 A * | 4/1992 | Fingerson | ............ | A01D 43/003 |
| | | | | 34/203 |
| 5,156,570 A * | 10/1992 | Justice, III | ........... | A01D 41/133 |
| | | | | 460/118 |
| 6,536,133 B1 * | 3/2003 | Snaper | .................... | A23B 9/08 |
| | | | | 34/265 |
| 8,661,703 B1 * | 3/2014 | Bensalma | ............. | F26B 17/026 |
| | | | | 34/88 |
| 9,295,197 B1 | 3/2016 | Veikle et al. | | |
| 9,506,693 B2 * | 11/2016 | Pauling | .................. | F26B 17/14 |
| 9,949,437 B2 * | 4/2018 | Powell | ................ | A01D 41/133 |
| 10,527,351 B2 * | 1/2020 | Fausto | ...................... | F26B 3/04 |
| 2015/0026992 A1 * | 1/2015 | Kim | ...................... | F26B 23/001 |
| | | | | 34/86 |
| 2016/0270295 A1 | 9/2016 | Bilde | | |
| 2017/0303472 A1 * | 10/2017 | Powell | ............... | A01D 41/1217 |
| 2021/0131732 A1 * | 5/2021 | Franceschetti | ........ | F26B 21/086 |

FOREIGN PATENT DOCUMENTS

| | | |
|---|---|---|
| CN | 204237145 U | 4/2015 |
| CN | 204549190 U | 8/2015 |
| JP | 11178428 A | 7/1999 |

\* cited by examiner

DEVICE FOR CONVEYING AND FEEDING WET MATERIAL FOR CROSS-FLOW HOT AIR COMBINE HARVESTER

TECHNICAL FIELD

The present invention belongs to the field of agricultural machinery, in particular to a device for conveying and feeding material when harvesting wet crops with mechanized and combined method.

BACKGROUND ART

The general processes of mechanized combined harvesting include cutting, conveying, threshing, separating and cleaning, etc., wherein, the conveying process is a key transitional process before crops threshing, which plays the role of conveying and feeding material. The carrying capacity of the device for conveying and feeding is directly related to the operation capacity of the whole machine, and the smoothness of the conveying and feeding process directly affects the efficiency of several subsequent operation processes. Therefore, the device for conveying and feeding in mechanized combined harvesting is very important.

At present, the device for conveying and feeding material of the mainstream combine harvester adopts a chain-rake type conveying structure, which mainly consists of front and rear sprockets, a conveying chain, rake teeth, a housing of a conveying groove and a tension adjusting mechanism, wherein, the housing of the conveying groove has a large opening at the material inlet and a small opening at the material output. The rake teeth are fixed on the conveying chain and move with the conveying chain. The conveying and feeding of material is realized by the action of the continuous pushing of the rake teeth when working. However, during the mechanized combined harvesting of wet crops, due to the high moisture content and high stickiness of stalks and grains of crops, different degree of blockage problems will be often caused in the material conveying process of mechanized combined harvesting, which seriously restricts the material conveying and feeding efficiency, and thus significantly reduces the operation efficiency of the whole machine.

The utility model patent with the patent No. CN201520240882.9 discloses a buried scraper conveying device, which consists of a box, a driving wheel, a driven wheel, a traction chain and a scraper. The purpose of avoiding material blockage is achieved by installing a separator above the discharge outlet inside the box to block the material on the scraper. The technical scheme and idea published in this patent is to solve the problem of material blockage by means of compulsory action, which can be used for the transportation of bulk particles, but not for conveying and feeding of crops in mechanized combined harvesting.

The utility model patent with the patent No. CN201320265279.7 discloses combined harvester conveying groove weed-winding-prevention structure, which consists of a driving shaft, an active sprocket, a housing of a conveying groove and a passive roller assembly. The effect of avoiding the weed-winding of the driving shaft and the driven shaft is mainly achieved by increasing the diameter of the driving shaft and the driven shaft (i.e., increasing the circumferential length). The technical scheme published in this patent only expects to obtain the purpose of avoiding weed-winding by simply increasing the circumferential length of the driving shaft and the driven shaft in terms of the harvesting height of the crops (the length of the feeding crops), without fully considering the high moisture content characteristics of the wet crops itself (including the stalks and grains) and neglecting the intrinsic problems such as sticky blockage and blocking blockage caused by wet-sticky characteristics of wet crops during transportation.

The utility model patent with the patent No. CN201420722484.6 discloses a conveyor for preventing material clogging, which consists of a motor reducer, an outer tube body and a screw conveyor shaft. The main technical scheme is to heat the bonded material in the screw conveyor shaft through the built-in heating pipe and shake the external pipe body by the external shaking device respectively in the stage time, so as to obtain the purpose of preventing the material blockage in the screw conveyor. The technical scheme published in this patent takes into account the moisture characteristics of the material itself when solving the blockage problem in the process of material transportation, and adopts the methods of heating and shaking. However, this method can only be used in staged working mode, and can only play its role after the blockage occurs, and does not have sustained effect and preventive function.

CONTENTS OF THE INVENTION

In view of the shortcomings of the prior art, the present invention provides a device for conveying and feeding wet material for cross-flow hot air combine harvester, in order to ensure the conveying and feeding efficiency of wet crops and avoid the blockage of conveying and feeding when the wet crops are harvested in combination with mechanization.

The technical solution adopted by the present invention is:

A device for conveying and feeding wet material for cross-flow hot air combine harvester consists of two parts: hot air pumping part and material conveying part. The hot air pumping part consists of an engine radiator, an exhaust guide hood, an exhaust pipe, an exhaust pump, an air supply pipe and an air supply guide hood. One end of the exhaust pipe is connected with the engine radiator through the exhaust guide hood, and the other end is connected with the air inlet of the exhaust pump. One end of the air supply pipe is connected with the air outlet of the exhaust pump, and the other end of the air supply pipe is connected with the air supply guide hood. The material conveying part consists of a chain rake conveying groove structure A and a cross-flow wind chamber structure B which are arranged over and under. The chain rake conveying groove structure A consists of a conveying groove housing, and a driving sprocket wheel, a driven sprocket wheel, a conveying chain and a chain rake, which are located in the conveying groove housing. The conveying groove housing is the space for conveying material, the driving sprocket wheel is connected with the driven sprocket wheel through the conveying chain, and the chain rake is an L-shaped structure, which is connected with the conveying chain by riveting, and is equally distributed in the circumference direction of the conveying chain.

The cross-flow wind chamber structure B is located at the lower part of the chain rake conveying groove structure A, and comprises the bottom plate of the conveying groove installed under the lower cover plate of the conveying groove, and the bottom plate of the conveying groove and the bottom surface of the conveying groove housing constitute the cross-flow wind chamber. The lower end of the cross-flow wind chamber structure B is an air inlet and connected with the air supply guide hood. The bottom surface of the conveying groove housing is machined with a series of air outlets and wind guide micro-structures, the wind guide micro-structures are located at the air outlet to guide the air flow towards the direction of the material feeding inlet.

Further, the conveying groove housing consists of an upper cover plate of the conveying groove, a lower cover plate of the conveying groove and two side plates of the conveying groove, and the upper cover plate of the conveying groove is not parallel to the lower cover plate of the conveying groove. The width of the material inlet end of the conveying groove housing is larger than the width of the material outlet end. The gap between the chain rake and the lower cover plate of the conveying groove of the conveying groove housing is maintained for 5 to 10 mm to form the feeding space for conveying material.

Further, the air outlet is located on the lower cover plate of the conveying groove and is equally distributed with a spacing l ranging from 25 mm to 60 mm, and the width of the air outlet s ranges from 5 mm to 12 mm.

Further, the wind guide micro-structure is a plate-like structure with an angle to the lower cover plate of the conveying groove. The angle β between the wind guide micro-structure and the lower cover plate of the conveying groove ranges from 10° to 25°. The vertical line of the vertex p of the wind guide micro-structure must intersect with the lower cover plate of the conveying groove, and the perpendicular line segment length d between the vertex p and the lower cover plate of the conveying groove is less than or equal to 5 mm.

Further, the upper end of the cross-flow wind chamber is provided with a cross-flow wind wheel, and the axis position of the wind wheel shaft of the cross-flow wind wheel must be below the extension line of the bottom plate of the conveying groove. Further, the cross-flow wind wheel is composed of a wind wheel shaft, a plane blade, a wheel ring, a cross-flow blade, a wind wheel casing and a wind wheel access cover. One end of the wind wheel shaft is supported by a bearing seat, and the other end of the wind wheel shaft is connected with a speed regulating drive motor. A plurality of plane blades are connected to the supporting rib by riveting to be fixed on the wind wheel shaft and be uniformly distributed around the circumference. The wheel ring is welded at the circumferential top of the plane blade and the wheel ring is tangent to the extension line of the lower cover plate of the conveying groove. The cross-flow blade is a two-section bending thin sheet, the bottom of which is welded on the wheel ring, and a plurality of cross-flow blades are equally distributed on the wheel ring. The section at the top of the cross-flow blade bends towards the opposite direction of the rotation direction of the cross-flow wind wheel. The cross-flow blade does not interfere with the movement of the chain rake. The two ends of the wind wheel casing located under the cross-flow wind wheel are connected with the bottom plate of the conveying groove and the lower cover plate of the conveying groove respectively.

Further, a plurality of cross-flow blades are distributed at an equal interval of 30° on the wheel ring.

Further, the bending angle α of the cross-flow blade is 5° to 20° Further, the wind guide micro-structure at the location where the lower cover plate of conveying groove matches with the cross-flow wind wheel is arc-shaped with a height of 3 mm to 5 mm and a trajectory gap of 1 mm to 2 mm to the top of the cross-flow blade. The part of the lower cover plate of conveying groove located above the cross-flow wind wheel is a sealing plate.

Further, a wind wheel access cover with a radian range of 60° to 90° is located directly below the wind wheel casing.

Further, a wind chamber cavity regulating mechanism is provided in the cross-flow wind chamber, the wind chamber cavity regulating mechanism comprises a regulating plate and a adjusting nut. One end of the regulating plate is hinged with the lower end of the bottom plate of the conveying groove, and the other end of the regulating plate is L-shaped and placed freely through a rectangular hole at the upper end of the bottom plate of the conveying groove. The adjusting nut is close to the L structure of the right end of the regulating plate and connected with the bottom plate of the conveying groove through the threaded hole. Rotating the adjusting nut can make the right end of the regulating plate to move up or down, to adjust the proportion of the upper end and lower end of the cross-flow wind chamber cavity.

Further, the upward adjustable range of the right end of the regulating plate does not exceed ⅔ of the vertical distance between the lower cover plate of the conveying groove and the bottom plate of the conveying groove.

Further, the lower cover plate of the conveying groove is parallel to the bottom plate of the conveying groove.

Further, the spacing Wd between the lower cover plate of the conveying groove and the bottom plate of the conveying groove is less than or equal to 50 mm.

Further, the velocity range of the hot air flow at the outlet of the air supply guide hood is 5 m/s to 12 m/s.

The beneficial effect of the present invention is as follows:

The device for conveying and feeding wet material for cross-flow hot air combine harvester provided in the present invention is composed of two parts: hot air pumping part and material conveying part. In the hot air pumping part, the waste hot air is extracted from the engine radiator of the combine harvester through a pipeline by an air pump, and the waste hot air is quickly conveyed outward, which provides the fast flow hot air for the device for conveying and feeding wet material for the whole cross-flow hot air combine harvester. The material conveying part generally comprises upper-layer structure and lower-layer structure, which is composed of a chain rake conveying groove structure A at the upper-layer and a cross-flow wind chamber structure B at the lower-layer, which can play the role of drying wet materials with hot air and feeding them by forced conveying. The chain rake conveying groove structure A plays the role of forced conveying and feeding of materials. The cross-flow wind chamber structure B plays the role of guiding and drying with hot air, auxiliary feeding by air blowing and forced feeding by cross-flow wind wheel.

The device for conveying and feeding wet material for cross-flow hot air combine harvester in the present invention can make full use of the waste heat generated by the engine body when the combine harvester works. By conducting pumping action at the engine thermovent, it can not only make full use of the material and reduce the thermal radiation and aging effect of engine high temperature on the surrounding facilities, but also significantly reduce the engine working temperature of combine harvester, guarantee the engine performance, and improve the working stability and reliability of engine. At the same time, the device for conveying and feeding wet material for cross-flow hot air combine harvester according to the present invention accelerates the suction and conveying of the waste hot air generated by the engine through an air pump and is guided to the cross-flow wind chamber under the conveying groove by a pipeline and the humid agricultural materials can be heated from bottom to top in the whole process of transportation after harvesting in the field and before entering the threshing stage, which can significantly reduce the moisture content of the humid agricultural materials, avoid the blockage of transportation and threshing caused by humidity, improve the smoothness of the transportation of humid materials, and is very conducive to ensure the operation performance of subsequent threshing and cleaning links.

In the figures,

1. engine radiator, 2. exhaust guide hood, 3. exhaust pipe, 4. exhaust pump, 5. air supply pipe, 6. air supply guide hood, 7. driving sprocket wheel, 8. driven sprocket wheel, 9. conveying chain, 10. chain rake, 11. conveying groove housing, 12. bottom plate of the conveying groove, 13. wind chamber cavity regulating mechanism, 14. cross-flow wind wheel, 11-*a*. upper cover plate of the conveying groove, 11-*b*. lower cover plate of the conveying groove, 11-*c*. two side plates of the conveying groove; 13-*a*. regulating plate, 13-*b*. adjusting nut; 14-*a*. wind wheel shaft, 14-*b*. plane blade, 14-*c*. wheel ring, 14-*d*. cross-flow blade, 14-*e*. wind wheel casing, 14-*f* wind wheel access cover.

EMBODIMENTS

Hereunder the present invention will be further detailed in embodiments with reference to the drawings, but the protection scope of the present invention is not limited thereto.

Figure 1:
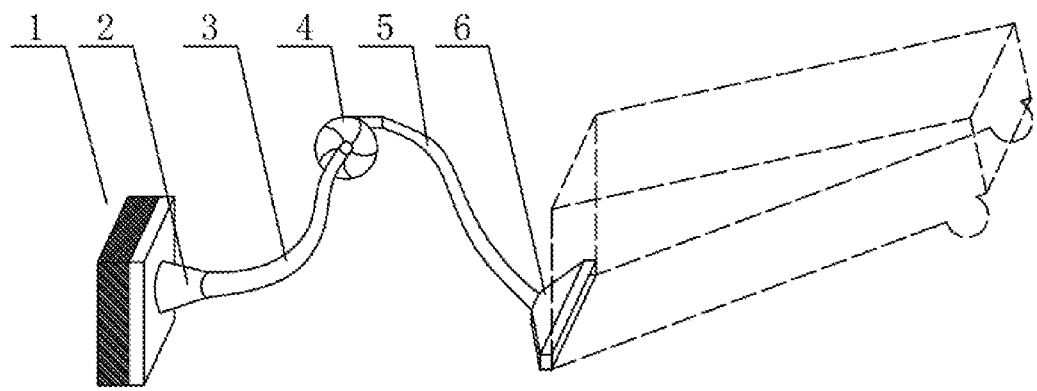
FIG. 1 is a schematic view of the overall structure of the device for conveying and feeding wet material for cross-flow hot air combine harvester according to the present invention.

As shown in FIG. 1, the device for conveying and feeding wet material for cross-flow hot air combine harvester in the present invention is composed of two parts: hot air pumping part and material conveying part. In the hot air pumping part, the waste hot air is extracted from the engine radiator of the combine harvester through a pipe by an air pump, and the waste hot air is quickly conveyed outward to provide a fast flow hot air for the device for conveying and feeding wet material for the whole cross-flow hot air combine harvester. The hot air pumping part consists of an engine radiator 1, an exhaust guide hood 2, an exhaust pipe 3, an exhaust pump 4, an air supply pipe 5 and an air supply guide hood 6. One end of the exhaust pipe 3 is connected with the engine radiator 1 through the exhaust guide hood 2, and the other end of the exhaust pipe 3 is connected with the air inlet of the exhaust pump 4. One end of the air supply pipe 5 is connected with the air outlet of the exhaust pump 4, and the other end of the air supply pipe 5 is connected with the air supply guide hood 6. The velocity range of the hot air flow at the outlet of the air supply guide hood 6 is 5 m/s to 12 m/s. The arrangement of the hot air pumping pipe space is determined by the specific type of machine.

Figure 2:
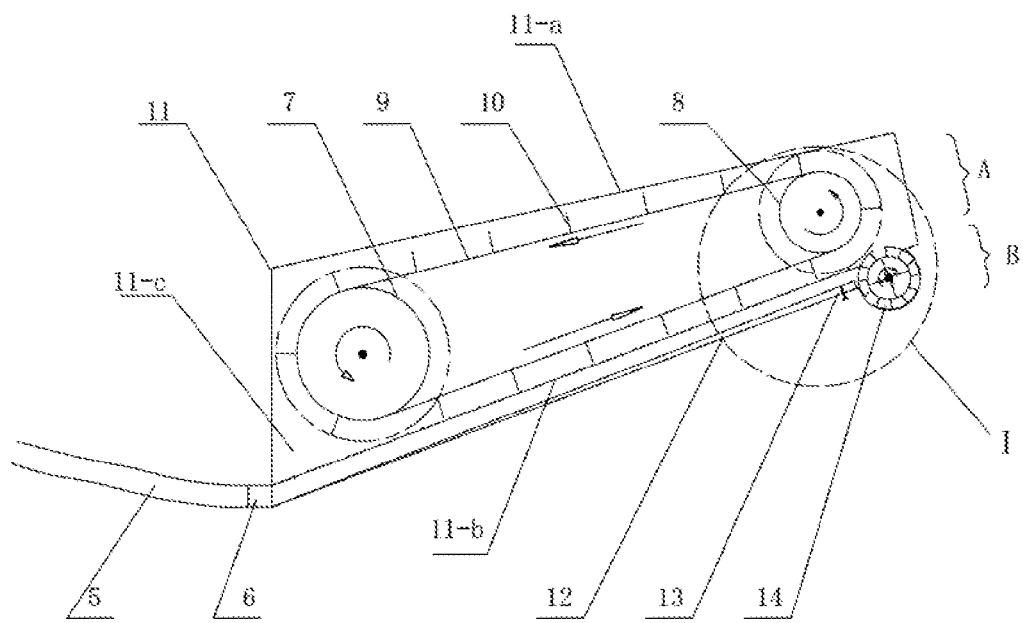
FIG. 2 is a structural schematic view of the material conveying part according to the present invention.

As shown in FIG. 2, the material conveying part generally comprises upper-layer structure and lower-layer structure, which are the upper-layer chain rake conveying groove structure A and the lower-layer cross-flow wind chamber structure B, which play the role of hot air drying and forced conveying feeding for wet materials. Chain rake conveying groove structure A plays the role of forced conveying and feeding of materials, and is located at the upper part of the material conveying part. Chain rake conveying groove structure A consists of a driving sprocket wheel 7, a driven sprocket wheel 8, a conveying chain 9, a chain rake 10 and a conveying groove housing 11. The driving sprocket wheel 7 is connected with the driven sprocket wheel 8 through the conveying chain 9, and receives power input from the engine of the combine harvester. The diameter of the driving sprocket wheel 7 is larger than the diameter of the driven sprocket wheel 8. The chain rake 10 is an L-shaped structure, which is connected with conveying chain 9 by riveting and equally distributed in the circumference direction of conveying chain 9 with equal spacing. Conveying groove housing 11 is composed of an upper cover plate of conveying groove 11-*a*, a lower cover plate of the conveying groove 11-*b*, and two side plates of the conveying groove 11-*c*. The upper cover plate of conveying groove 11-*a* is not parallel to lower cover plate of the conveying groove 11-*b*. The width of material inlet end of conveying groove housing 11 is larger than the width of material outlet end of conveying groove housing 11. And two through-holes are machined on the two side plates of the conveying groove 11-*c* respectively, which are used for assembling the driving sprocket wheel 7, the driven sprocket wheel 8 and supporting bearing seat. The gap between the chain rake 10 and the lower cover plate of the conveying groove 11-*b* of the conveying groove housing 11 is 5 mm to 10 mm, which is used to form the space for conveying and feeding material.

Figure 3:
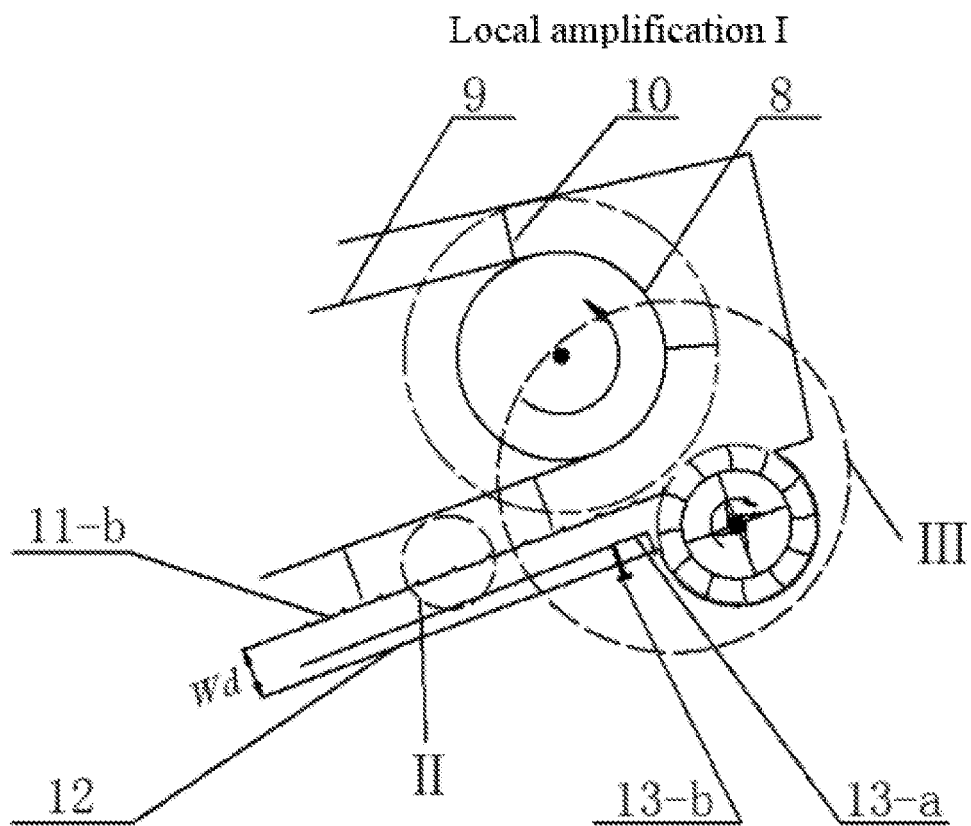
FIG. 3 is a partial schematic view of the cross-flow wind chamber structure according to the present invention.
Figure 4:
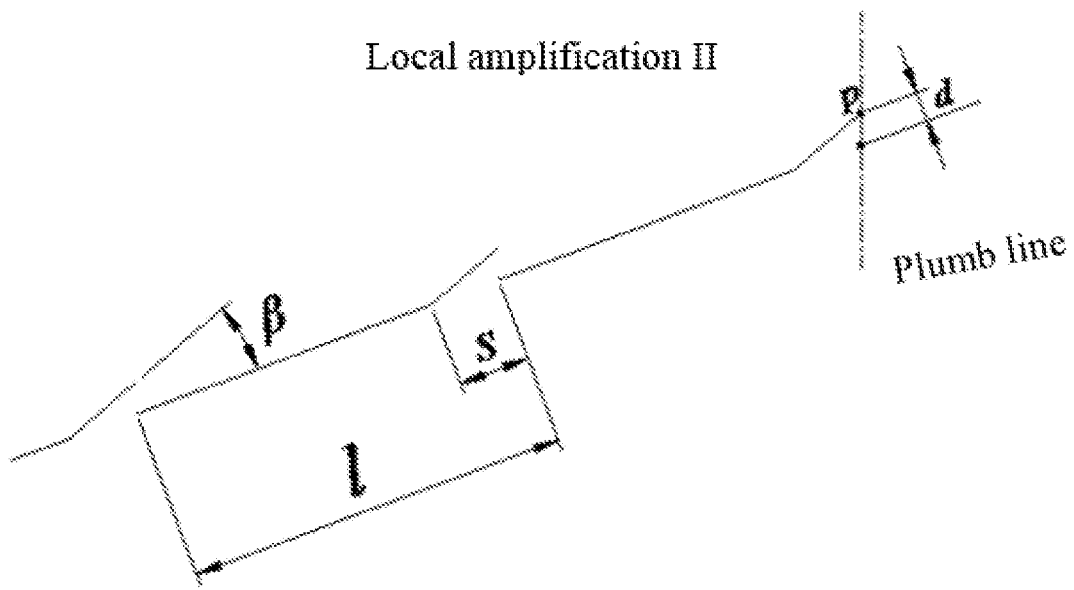
FIG. 4 is a partial enlargement schematic view of the wind guide micro-structure in the cross-flow wind chamber structure according to the present invention.

The cross-flow wind chamber structure B plays the roles of hot air drying, auxiliary feeding by air blowing and forced feeding of the cross-flow wind wheel. The cross-flow wind chamber structure B is located at the lower part of the chain rake conveying groove structure A, including the bottom plate of conveying groove 12 installed under the lower cover plate of the conveying groove 11-*b*. The bottom plate of conveying groove 12 and the bottom surface of the conveying groove housing 11 together constitute the cross-flow wind chamber. The cross-flow wind chamber structure B is composed of a bottom plate of conveying groove 12, a wind chamber cavity regulating mechanism 13 and a cross-flow wind wheel 14, as shown in FIGS. 3 and 4. The lower cover plate of the conveying groove 11-*b* is parallel to the bottom plate of the conveying groove 12, and the vertical distance Wd between the two plates is less than or equal to 50 mm. The lower end of the cross-flow wind chamber structure B is the air inlet and is connected with the air supply guide hood 6. A series of air outlets and wind guide micro-structures are machined on the lower cover plate of the conveying groove 11-*b*, which play the role of hot air export, and the wind guide micro-structures are located at the air outlet. Specific requirements are as follows: the air outlet structure is equally spaced on the lower cover plate of the conveying groove 11-*b* with spacing l ranging from 25 mm to 60 mm and the width s of the air outlet ranges from 5 mm to 12 mm. The wind guide micro-structure is a plate-like structure with an angle to the lower cover plate of the conveying groove 11-*b*. The angle β between the wind guide micro-structure and the lower cover plate of the conveying groove 11-*b* ranges from 10° to 25°. The vertical line through the vertex p of the wind guide micro-structure must intersect with the lower cover plate of the conveying groove 11-*b*, and the perpendicular line segment length d between the vertex p and the lower cover plate of the conveying groove 11-*b* is less than or equal to 5 mm.

The wind chamber cavity regulating mechanism 13 is composed of a regulating plate 13-a and an adjusting nut 13-b, wherein, the left end of the regulating plate 13-a is connected with the left end of the bottom plate of conveying groove 12 by hinges, and the right end is L-shaped and placed freely through the rectangular hole of the right end of the bottom plate of the conveying groove 12. The adjusting nut 13-b is close to the L structure of the right end of the regulating plate 13-a and connected with the bottom plate of the conveying groove 12 through the threaded hole. Rotating the adjusting nut 13-b can make the right end of the regulating plate 13-a to move up or down to adjust the proportion of the upper end and lower end of the cross-flow wind chamber cavity. It is required that the upward adjustment range of the right end of the regulating plate 13-a should be no more than ⅔ of the vertical distance between the lower cover plate of conveying groove 11-b and the bottom plate of conveying groove 12.

Figure 5:
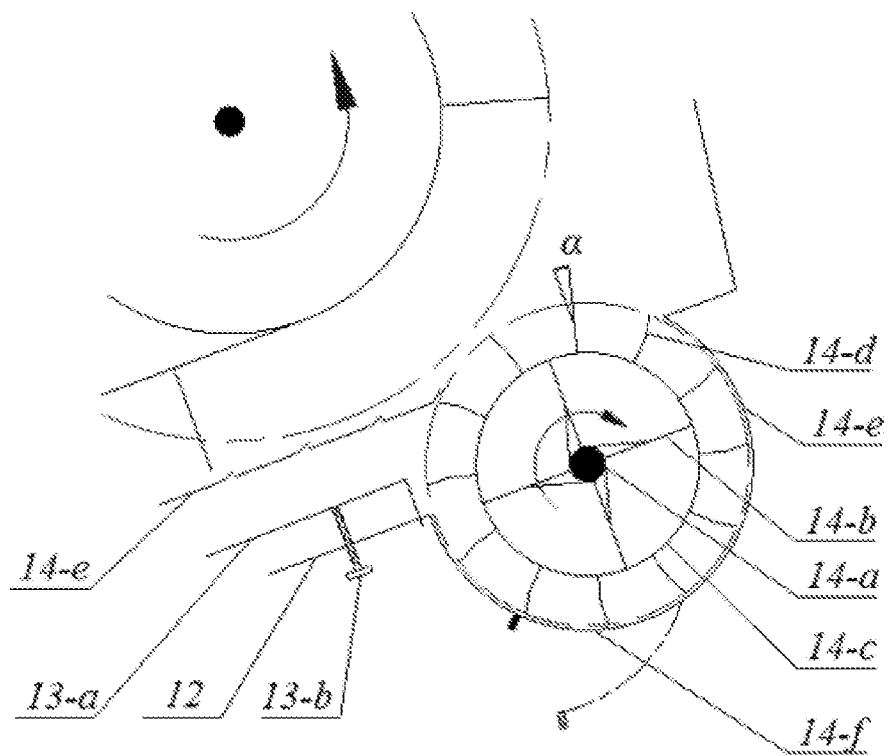
FIG. 5 is a partial enlargement schematic view of the cross-flow wind wheel in the cross-flow wind chamber structure according to the present invention.

As shown in FIGS. 2 and 5, the cross-flow wind wheel 14 is located at the upper end of the cross-flow wind chamber structure B and acts as a combination of suction, diversion and forced feeding. It consists of a wind wheel shaft 14-a, a plane blade 14-b, a wheel ring 14-c, a cross-flow blade 14-d, a wind wheel casing 14-e and a wind wheel access cover 14-f.

The whole cross-flow wind wheel 14 has a circular structure with end cover plates on both inner side and outer side. The axis of the wind wheel shaft 14-a must be located below the extension line of the bottom plate of the conveying groove 12. One end of the wind wheel shaft 14-a is supported by a bearing base, and the other end of the wind wheel shaft 14-a is connected with the speed regulating drive motor. There are four plane blades 14-b, which are distributed on the circumference at 90° interval, and connected with the support reinforcement by riveting to be fixed on the wind wheel shaft 14-a. The wheel ring 14-c is fixed at the circumferential top of the plane blade 14-b by welding, and the wheel ring 14-c is required to be tangent to the extension line of the lower cover plate of the conveying groove 11-b. The cross-flow blade 14-d is a sheet bending structure, and the bottom is welded with the wheel ring 14-c and distributed on the wheel ring 14-c at an equal interval of 30°, and the top bends backward along the rotation direction and the inclination angle α for bending backward is 5° to 20°. The height of the cross-flow blade 14-d is required to be in the range of 10 mm to 25 mm and does not interfere with the movement of the chain rake 10. In order to achieve a better wind guide effect, the wind guide micro-structure where the lower cover plate of the conveying groove 11-b matches the left side of the cross-flow wind wheel 14 is an arc structure with a height of 3 mm to 5 mm and a gap of 1 mm to 2 mm between the top trajectory of the cross-flow blade 14-d and the wind guide micro-structure. The matching part between the lower cover plate of the conveying groove 11-b and the right side of the cross-flow wind wheel 14 is a light plate structure and naturally intersects with the wind wheel casing 14-e. The wind wheel casing 14-e is located below the cross-flow wind wheel 14, which is a circular arc structure, the inner side of the wind wheel casing 14-e and the cross-flow blade maintain a gap of 2 mm. The wind wheel access cover 14-f is an arc structure and located directly below the wind wheel casing 14-e with a radian range of 60° to 90°. The above-mentioned embodiment is the preferred embodiment of the present invention, but the present invention is not limited to the above-mentioned embodiment. Without departing from the essential contents of the present invention, any obvious improvement, replacement or variation that can be made by those skilled in the art are within the scope of the present invention.

The invention claimed is:

1. A device for conveying and feeding wet material for cross-flow hot air combine harvester, comprising two parts: a hot air pumping part and a material conveying part;
   the hot air pumping part consists of an engine radiator, an exhaust guide hood, an exhaust pipe, an exhaust pump, an air supply pipe and a supply guide hood;
   one end of the exhaust pipe is connected with the engine radiator through the exhaust guide hood, and the other end of the exhaust pipe is connected with an air inlet of the exhaust pump;
   one end of the air supply pipe is connected with an air outlet of the exhaust pump, and the other end of the air supply pipe is connected with the air supply guide hood;
   the material conveying part consists of a chain rake conveying groove structure (A) and a cross-flow wind chamber structure (B) which are arranged over and under;
   the chain rake conveying groove structure LAS consists of a conveying groove housing, and a driving sprocket wheel, a driven sprocket wheel, a conveying chain and a chain rake which are located in the conveying groove housing;
   the conveying groove housing is the space for conveying material, the driving sprocket wheel is connected with the driven sprocket wheel through the conveying chain, and the chain rake is an L-shaped structure, which is connected with the conveying chain by riveting, and is equally distributed in the circumference direction of the conveying chain;
   the cross-flow wind chamber structure (B) is located at the lower part of the chain rake conveying groove structure (A), and includes a bottom plate of the conveying groove installed under a lower cover plate of the conveying groove, and the bottom plate of the conveying groove and the bottom surface of the conveying groove housing constitute the cross-flow wind chamber; the lower end of the cross-flow wind chamber structure (B) is an air inlet and connected with the air supply guide hood;
   the bottom surface of the conveying groove housing is machined with a series of air outlets and wind guide micro-structures, the wind guide micro-structures are located at the air outlets to guide the air flow towards the direction of a material feeding inlet.

2. The device for conveying and feeding wet material for cross-flow hot air combine harvester according to claim 1, wherein the conveying groove housing consists of an upper cover plate of the conveying groove, the lower cover plate of the conveying groove and two side plates of the conveying groove, the upper cover plate of the conveying groove is not parallel to the lower cover plate of the conveying groove; the width of the material feeding inlet end of the conveying groove housing is larger than the width of a material outlet end; the gap between the chain rake and the lower cover plate of the conveying groove of the conveying groove housing is maintained for 5 mm to 10 mm to form a space for conveying and feeding material.

3. The device for conveying and feeding wet material for cross-flow hot air combine harvester according to claim 1, wherein the air outlets are located on the lower cover plate of the conveying groove and are distributed with an equal spacing (I) ranging from 25 mm to 60 mm and the width (s) of the air outlet ranges from 5 mm to 12 mm.

4. The device for conveying and feeding wet material for cross-flow hot air combine harvester according to claim 1, wherein the wind guide micro-structure is a plate-like structure with an angle to the lower cover plate of the conveying groove; the angle (β) between the wind guide micro-structure and the lower cover plate of the conveying groove ranges from 10° to 25°; the vertical line of the vertex of the wind guide micro-structure must intersect with the lower cover plate of the conveying groove, and the perpendicular line segment length (d) between the vertex and the lower cover plate of the conveying groove is less than or equal to 5 mm.

5. The device for conveying and feeding wet material for cross-flow hot air combine harvester according to claim 1, wherein the upper end of the cross-flow wind chamber is provided with a cross-flow wind wheel, and the axis position of a wind wheel shaft of the cross-flow wind wheel must be below the extension line of the bottom plate of the conveying groove.

6. The device for conveying and feeding wet material for cross-flow hot air combine harvester according to claim 5, wherein the cross-flow wind wheel is composed of the wind wheel shaft, a plane blade, a wheel ring, a cross-flow blade, a wind wheel casing and a wind wheel access cover; one end of the wind wheel shaft is supported by a bearing seat, and the other end of the wind wheel shaft is connected with a speed regulating drive motor; a plurality of plane blades are fixed on the wind wheel shaft and uniformly distributed around the circumference; the wheel ring is welded at the circumferential top of the plane blade, and is tangent to the extension line of the lower cover plate of the conveying groove; the cross-flow blade is a two-section bending thin sheet, the bottom of the cross-flow blade is welded on the wheel ring, and a plurality of cross-flow blades are equally distributed on the wheel ring; the section at the top of the cross-flow blade bends towards the opposite direction of the rotation direction of the cross-flow wind wheel; the cross-flow blade does not interfere with the movement of the chain rake; the two ends of the wind wheel casing located under the cross-flow wind wheel are connected with the bottom plate of the conveying groove and the lower cover plate of the conveying groove respectively.

7. The device for conveying and feeding wet material for cross-flow hot air combine harvester according to claim 6, wherein a plurality of cross-flow blades are distributed on the wheel ring at an equal interval of 30°.

8. The device for conveying and feeding wet material for cross-flow hot air combine harvester according to claim 6, wherein the bending angle (α) of the cross-flow blade is 5° to 20°.

9. The device for conveying and feeding wet material for cross-flow hot air combine harvester according to claim 6, wherein the wind guide micro-structure where the lower cover plate of the conveying groove matches with the cross-flow wind wheel is arc-shaped structure with a height of 3 mm to 5 mm, and a gap of between the wind guide micro-structure and the trajectory of the top of the cross-flow blade is 1 mm to 2 mm; the part of the lower cover plate of the conveying groove located above the cross-flow wind wheel is a sealing plate.

10. The device for conveying and feeding wet material for cross-flow hot air combine harvester according to claim 6, wherein the wind wheel access cover with a radian range of 60° to 90° is located directly below the wind wheel casing.

11. The device for conveying and feeding wet material for cross-flow hot air combine harvester according to claim 1, wherein a wind chamber cavity regulating mechanism is provided in the cross-flow wind chamber, the wind chamber cavity regulating mechanism comprises a regulating plate and an adjusting nut; one end of the regulating plate is hinged with the lower end of the bottom plate of the conveying groove, and the other end of the regulating plate is an L-shaped structure and placed freely through a rectangular hole at the upper end of the bottom plate of the conveying groove; the adjusting nut is close to the L-shaped structure of the right end of the regulating plate and connected with the bottom plate of the conveying groove through the threaded hole; rotating the adjusting nut makes the right end of the regulating plate to move up or down, to adjust the proportion of the upper end and lower end of the cross-flow wind chamber cavity.

12. The device for conveying and feeding wet material for cross-flow hot air combine harvester according to claim 11, wherein the upward adjustable range of the right end of the regulating plate does not exceed ⅔ of the vertical distance between the lower cover plate of the conveying groove and the bottom plate of the conveying groove.

13. The device for conveying and feeding wet material for cross-flow hot air combine harvester according to claim 1, wherein the lower cover plate of the conveying groove is parallel to the bottom plate of the conveying groove.

14. The device for conveying and feeding wet material for cross-flow hot air combine harvester according to claim 13, wherein the spacing (Wd) between the lower cover plate of the conveying groove and the bottom plate of the conveying groove is less than or equal to 50 mm.

15. The device for conveying and feeding wet material for cross-flow hot air combine harvester according to claim 13, wherein the velocity range of the hot air flow at the outlet of the air supply guide hood is 5 m/s to 12 m/s.

* * * * *